(12) United States Patent
Ward et al.

(10) Patent No.: US 7,687,586 B2
(45) Date of Patent: Mar. 30, 2010

(54) BIOSENSOR MEMBRANE MATERIAL

(75) Inventors: Robert S. Ward, Lafayette, CA (US);
Yuan Tian, Alameda, CA (US); W. Kenneth Ward, Portland, OR (US);
Ellen Anderson, Tualatin, OR (US);
Jody House, Hillsboro, OR (US)

(73) Assignee: Isense Corporation, Wilsonville, OR (US)

( * ) Notice: Subject to any disclaimer, the term of this patent is extended or adjusted under 35 U.S.C. 154(b) by 741 days.

(21) Appl. No.: 11/404,528

(22) Filed: Apr. 14, 2006

(65) Prior Publication Data

US 2006/0183871 A1    Aug. 17, 2006

Related U.S. Application Data

(63) Continuation-in-part of application No. 10/851,809, filed on May 21, 2004, now Pat. No. 7,157,528.

(60) Provisional application No. 60/473,015, filed on May 21, 2003.

(51) Int. Cl.
*C08G 77/42* (2006.01)

(52) U.S. Cl. .................. 525/474; 525/462; 600/347; 204/403.11

(58) Field of Classification Search .......... 525/474, 525/462; 600/347; 204/403.11
See application file for complete search history.

(56) References Cited

U.S. PATENT DOCUMENTS

| 4,686,044 | A | 8/1987 | Behnke |
| 5,322,063 | A | 6/1994 | Allen |
| 5,428,123 | A | 6/1995 | Ward |
| 5,589,563 | A | 12/1996 | Ward |
| 5,756,632 | A | 5/1998 | Ward |
| 5,777,060 | A | 7/1998 | Van Antwerp |
| 5,863,627 | A | 1/1999 | Szycher |
| 5,962,620 | A | 10/1999 | Reich |
| 6,083,524 | A | 7/2000 | Sawhney |
| 6,172,180 | B1 | 1/2001 | Hancock |
| 6,206,835 | B1 | 3/2001 | Spillman, Jr. |
| 6,313,254 | B1 | 11/2001 | Meijs |

FOREIGN PATENT DOCUMENTS

WO    94/05361    3/1994

*Primary Examiner*—Kuo-Liang Peng
(74) *Attorney, Agent, or Firm*—Schwabe, Williamson & Wyatt, P.C.

(57) ABSTRACT

Embodiments of the present invention provide various multipolymers and permselective membranes for use with biosensors and other implantable medical devices and prostheses. Embodiments of the present invention may provide structural strength and integrity, and further may control the influx of glucose, oxygen and/or water. Embodiments of the present invention may, for example, minimize or reduce the influx of glucose by minimizing the percentage of hydrophilic segments, which in turn minimizes the percentage of water uptake and the degree of glucose transport.

4 Claims, 3 Drawing Sheets

BIOSENSOR MEMBRANE MATERIAL

CROSS REFERENCE TO RELATED APPLICATIONS

The present application is a continuation-in-part of and claims priority to U.S. patent application Ser. No. 10/851,809, filed May 21, 2004 now U.S. Pat. No. 7,157,528, entitled "Permselective Structurally Robust Membrane Material," which claims priority to U.S. Provisional Patent Application No. 60/473,015, filed May 21, 2003, the entire disclosures of which are hereby incorporated by reference in their entirety.

TECHNICAL FIELD

Embodiments of the present invention relate to biochemical methods and products, and, more particularly to multi-polymers and membranes for biosensors. Additional embodiments of the present invention relate to implantable medical devices and prostheses including drug delivery devices and other applications taking advantage of selective permeability and structural strength, and integrity due to enhanced biostability.

BACKGROUND

Amperometric biosensors are capable of measuring glucose on a continuous basis in the subcutaneous space and the intravascular space of mammals. To the extent that such sensors utilize glucose oxidase and do not utilize an electron mediator, they use one dioxygen molecule for each molecule of glucose that is acted upon by the enzyme. Throughout the range of glucose concentrations, one oxygen molecule must accompany each glucose molecule in the enzyme layer of the sensor, in order for the glucose sensing reaction to occur. Such a reaction yields hydrogen peroxide, which, when oxidized at an indicating electrode, generates an electrical current.

When mammalian physiology is taken into account, it is clear that unless specific design precautions are taken, a glucose sensor may not respond adequately in an elevated glucose range, or in a low-oxygen ("hypoxia") range. It is well-known that the concentration of glucose in subcutaneous tissue is much greater than that of oxygen. In fact, the concentration of glucose may be several hundred times greater than that of oxygen, depending on specific physiological circumstances. It may be appreciated that if an outer membrane of a membrane-biosensor system does not allow a sufficient quantity of oxygen molecules into an underlying enzyme layer, the sensor output may not be proportional to the prevailing glucose concentration in the tissue. For example, at elevated glucose concentrations, a membrane with insufficient oxygen permeability (or too high a glucose permeability) may generate a current that plateaus as the glucose concentration continues to rise above normal concentrations. Often, in persons with diabetes mellitus, glucose concentrations may rise to very high concentrations, even exceeding 400 mg/dl in blood.

The problem of insufficient oxygen in conjunction with high glucose concentrations has been termed the oxygen deficit problem. A factor that contributes to the oxygen deficit problem is the fact that subcutaneous oxygen concentrations are much lower than blood oxygen concentrations. One study showed that in rabbits, the subcutaneous oxygen tension averaged only 30-50 Torr (Ward, W. K., Wood, M. D, Slobodzian, E. P., Continuous amperometric monitoring of subcutaneous oxygen in rabbit by telemetry, Vol. 26, page 158-67, Journal of Medical Engineering and Technology, 2002), and oxygen tension in mammalian blood is higher than this.

With regard to glucose oxidase-based biosensors that use an oxygen molecule for each glucose molecule, there is an oxygen deficit in normal mammals that reduces their measurement accuracy. It is important to note that the oxygen deficit problem may be even greater in persons with respiratory problems and in persons who live at high altitude. For example, individuals with severe asthma (reactive airways disease), chronic obstructive pulmonary disease (emphysema or chronic bronchitis), pneumonia, or hypoventilation from any cause (e.g. neurological conditions, musculoskeletal problems or drug-induced hypoventilation) often have abnormally low concentrations of oxygen in their blood and in their subcutaneous tissue. It may be seen that this problem of an oxygen deficit, which is significant in normal individuals, may be even greater in certain individuals or in certain environments. Particularly in a hospital setting, it is common to encounter patients who have one or more of the conditions that predispose a patient to low oxygen concentration in the blood. In addition, persons who live at high altitude have relatively low concentrations of oxygen in blood and tissue. A normal person living or vacationing in Leadville, Colo. would likely have a partial pressure of oxygen in arterial blood ($paO_2$) of approximately 55-65 Torr whereas the same individual living at sea level would have a $paO_2$ of 95-100 Torr.

In summary, with regard to amperometric sensors that use equimolar amounts of oxygen and glucose, there is a problem of an oxygen deficit in normal individuals. In persons located at a high altitude or who suffer from certain medical conditions, the problem may be even greater.

The problem of the oxygen deficit has been recognized by inventors in the field of amperometric glucose sensors. Shichiri disclosed a homogeneous hydrophobic membrane, but such a membrane typically does not provide the optimal balance between oxygen and glucose transport, see Glycaemic Control in Pancreatectomized dogs with a Wearable Artificial Endocrine Pancreas, published in *Diabetologia* 24, 179-84, 1983. Furthermore, such a membrane does not provide for tailoring the properties of the membrane by varying the preponderance of hydrophilic and hydrophobic moieties.

Other attempts have been made to measure glucose using a subcutaneous sensor, but the membranes used in such sensors typically take up substantial amounts of glucose. For this reason, these membranes are likely to plateau in their response to high concentrations of glucose when used in a setting of low tissue oxygen.

The issue of polymer strength is also important for sensor membranes that are placed in mammals. Various patents disclose methods of engineering materials to have particular permselectivities, see U.S. Pat. Nos. 5,428,123; 5,589,563; and 5,756,632, the disclosures of which are hereby incorporated by reference in their entirety. However, when efforts were made to use these materials in an indwelling glucose sensor application, it was found that the requirement for high oxygen and glucose permeability was at conflict with the requirement for structural strength and integrity desired for exposure to an oxidative environment. More specifically, it was found that when the material was made sufficiently oxygen permeable, it became too weak and tended to break apart on the sensor after being present in the body's interstitial fluid for more than a few hours.

Within biological solutions such as blood or interstitial fluid there exist a number of reactive materials and enzymes that may bring about cleavage of the polymer's molecular chains and thus result in loss of membrane strength and integrity. Some of the reactive materials and enzymes that may bring about polymer degradation and cleavage include small molecules such as superoxide ($O_2^-$), acids, and enzymes such as proteases and oxidases that react with the various types of linkages in the polymer. This loss of membrane or fiber integrity may be deleterious to applications which depend on the permselectivity of the polymeric material and the exclusion of solids and larger biological molecules, such as the detection of the levels of glucose within the body fluids of a living human body.

BRIEF DESCRIPTION OF THE DRAWINGS

Embodiments of the present invention will be readily understood by the following detailed description in conjunction with the accompanying drawings. To facilitate this description, like reference numerals designate like structural elements. Embodiments of the invention are illustrated by way of example and not by way of limitation in the figures of the accompanying drawings.

DETAILED DESCRIPTION OF EMBODIMENTS OF THE INVENTION

In the following detailed description, reference is made to the accompanying drawings which form a part hereof wherein like numerals designate like parts throughout, and in which is shown by way of illustration embodiments in which the invention may be practiced. It is to be understood that other embodiments may be utilized and structural or logical changes may be made without departing from the scope of the present invention. Therefore, the following detailed description is not to be taken in a limiting sense, and the scope of embodiments in accordance with the present invention is defined by the appended claims and their equivalents.

Various operations may be described as multiple discrete operations in turn, in a manner that may be helpful in understanding embodiments of the present invention; however, the order of description should not be construed to imply that these operations are order dependent.

The description may use perspective-based descriptions such as up/down, back/front, and top/bottom. Such descriptions are merely used to facilitate the discussion and are not intended to restrict the application of embodiments of the present invention.

For the purposes of the present invention, the phrase "A/B" means A or B. For the purposes of the present invention, the phrase "A and/or B" means "(A), (B), or (A and B)". For the purposes of the present invention, the phrase "at least one of A, B, and C" means "(A), (B), (C), (A and B), (A and C), (B and C), or (A, B and C)". For the purposes of the present invention, the phrase "(A)B" means "(B) or (AB)" that is, A is an optional element.

The description may use the phrases "in an embodiment," or "in embodiments," which may each refer to one or more of the same or different embodiments. Furthermore, the terms "comprising," "including," "having," and the like, as used with respect to embodiments of the present invention, are synonymous.

Embodiments of the present invention provide various permselective membranes for use with biosensors and other implanted medical devices and prostheses. Embodiments of the present invention may provide structural strength and integrity, and further may control the influx of glucose, oxygen and/or water. Other embodiments of the present invention may provide structural strength and integrity, and further may control the delivery of drugs and/or the permeability of gases, liquids or solutes within the body.

Embodiments of the present invention may minimize or reduce the influx of glucose by minimizing the percentage of hydrophilic segments (such as PEO), which in turn minimizes the percentage of water uptake and the degree of glucose transport.

Figure 1:
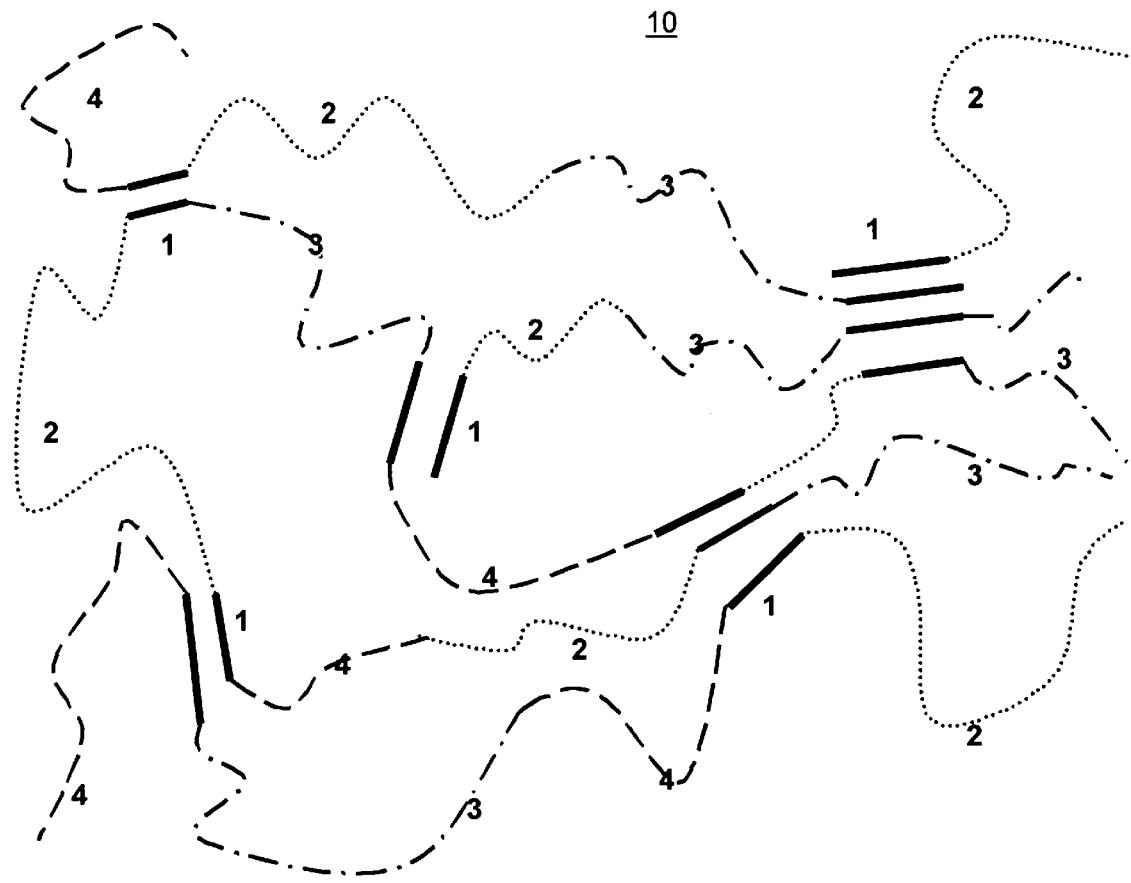
FIG. 1 is an illustration of a possible arrangement of hard segments and soft segments of several polymer chains in a biocompatible multipolymer according to an embodiment of the present invention.

In an embodiment of the present invention there is provided a multipolymer 10, a high molecular weight polymeric organic material consisting of different types of monomeric units, suitable for use in a glucose sensor or in an oxygen sensor that may be immersed for substantial periods of time in blood or interstitial fluids of the human body. Referring to FIG. 1, multipolymer 10 includes hard segments 1, polyurethane domains with a highly crystalline or glassy nature that associate with either interchain to provide the physical tensile strength of membranes made from the polymer. The energetically favorable associations between the individual molecular backbones provide regions that hold the chains together and require a substantial energy input to disrupt.

In an embodiment of the present invention, various soft segments may be utilized, individually or in plurality. In an embodiment of the present invention, soft segments of three different types may be, for example, oxygen-permeable soft segments 2, hydrophilic soft segments 3, and biostable hydrophobic soft segments 4, randomly situated in the individual molecular chains forming a non-homogeneous multipolymer.

In an embodiment of the present invention, the order of the segments may be controlled, at least in part, to affect, for example, the surface chemistry of the multipolymer. For example, in an embodiment of the present invention, hydrophilic soft segments may be utilized at the surface to control surface permeability, such as by utilizing soft segments as end groups of the polymer chain.

In an embodiment of the present invention, a soft segment may be directly attached to a hard segment, or to another type of soft segment. There may be multiple domains of each kind of segment, hard or soft, in the polymer material. The soft segments have relatively low associative forces or cohesive energy density with other soft segments or with hard segments, so a lesser degree of force would be required to dissociate the soft segments, giving membranes prepared from the polymer a rubbery or flexible character. The less crystalline or glassy nature of regions containing soft segments are the regions where oxygen, other gases and liquids, and aqueous solutions of drugs or other solutes may freely permeate the membrane. The hydrophobic soft segments 4, such as a polycarbonate, for example an aliphatic polycarbonate, likewise are less crystalline or glassy than the hard segments 1 at body temperature, and their resistance to degradation by the reactive chemicals and enzymes found in the tissue fluids of living human beings gives a greater degree of biostability to membranes prepared from a polymer in accordance with an embodiment of the present invention.

Again referring to FIG. 1, more specifically, in an embodiment, a multipolymer may consist of (1) hard segments or domains of substantially crystalline or glassy structure 1 at body temperature, that would have high melting point or glass transition temperatures (>37 C) if prepared as homopolymers, and (2) soft segments, of substantially amorphous structure 2, 3, and 4, that would have low melting or glass transition temperatures (<37 C) if prepared as homopolymers, that are permeable to aqueous solutions containing organic solutes such as glucose, and to dissolved gases such as oxygen, and are substantially stable to degradation in a biological environment.

In embodiments of the present invention, soft domains (2, 3, 4) may be oligomeric or polymeric segments of materials which intersperse and separate the hard domains 1 of the multipolymer, which may further comprise three distinct types or classes of polymeric materials: (i) polymer domains 2 that confer oxygen permeability to the material, (ii) polymer domains 3 that confer hydrophilicity to the material, and (iii) polymer domains 4 that confer biostability and/or hydrophobicity to the material, for example domains comprising polycarbonate-type structures. When the membrane is immersed in water, domains i, ii, and/or iii may be optionally thermodynamically compatible, with one or more of the three other domain types. Determination of thermodynamic compatibility is well known to those skilled in the art and may be defined, for example, as a merging of glass transition temperatures, or it may be indicated by the optical clarity of the membrane films.

In an embodiment of the present invention, the hard domains 1 of the multipolymer may confer physical strength and durability allowing the casting of dense, non-porous semi-permeable membranes, hollow fibers, tubes or other shaped articles with sufficient tensile strength and elasticity for use over relatively long periods of time immersed in fluids or tissues of the human body. In an embodiment of the present invention, the hard domains of the multipolymer comprise polyurethane structures that may also contain some urea-type linkages (N—(CO)—N) as well as urethane-type linkages (N—(CO)—O). These polyurethane-type polymers result from the reaction of various types of difunctional isocyanates (isocyanate group: R—N=C=O) with difunctional amines (R—$NH_2$) or alcohols (ROH), where R may be aliphatic, cycloaliphatic, aryl, hetero-aryl, or alkylaryl in nature. Such polyurethane structures are known to be strong, durable materials suitable for use in contact with biological solutions in living organisms, for example as described in U.S. Pat. No. 5,428,123, the entire disclosure of which is hereby incorporated by reference.

In embodiments of the present invention, the soft domains of the block copolymer may confer permeability by liquids, water solutions of compounds, and by oxygen and other gases, but the dense non-porous nature of membranes cast from these polymers are adequate to exclude insoluble materials such as cells and suspensions of solid materials. Thus, in an embodiment, the sheet or film membranes or tubes or hollow fibers made from the multipolymers of the present invention allow aqueous solutes and oxygen to permeate the membranes while disallowing solid materials to pass through.

In an embodiment of the present invention, the resistance of the multipolymer, and thus the resistance of membranes and fibers prepared from the multipolymer, to biological degradation, may be increased by inclusion of domains of soft, biostable, relatively hydrophobic segments consisting of, for example, polycarbonate-type materials (R—O—(CO)—O—R). Polycarbonates are oligomeric or polymeric materials where difunctional alcohols are linked via the difunctional carbonate group, where carbonate esters are formed linked to the difunctional alcohols through both available oxygen atoms of the carbonate moiety. In an embodiment of the present invention, a relatively hydrophobic segment may comprise aliphatic polycarbonate absent any ether groups, or other hydrophilic moiety.

In an embodiment of the present invention, it has been found that multipolymers synthesized with specified proportions of hard segment materials and of at least three distinct types of soft segment materials possess the desired properties of strength and durability, permeability to aqueous solutes and to oxygen, and chemical/physical stability, while in contact with biological fluids in living organisms.

In an embodiment of the present invention, block copolymers or multipolymers may be provided wherein the hard segments may comprise about 10-45 wt %, such as about 15-30 wt %, of the total, and the soft segments may comprise about 55-90 wt %, such as about 65-80 wt %, of the total, where among the soft segments, the three soft segment components may comprise about 5-25 wt %, such as about 10-20 wt %, of total soft segment dry weight of oxygen-permeable materials, less than about 25 wt %, for example less than about 10 wt %, such as less than about 5 wt % or less than about 2 wt %, of total soft segment dry weight of hydrophilic materials, and about 50-90 wt %, such as about 60-80 wt %, of total soft segment dry weight of biostable, relatively hydrophobic materials, for example polycarbonate-type materials. In an embodiment of the present invention, each segment may comprise one or more compatible component(s), such as multiple types of polycarbonate in the hydrophobic soft segments, etc. In an embodiment of the present invention, one or more soft segments discussed above may be excluded from a multipolymer or membrane constructed therefrom.

In an exemplary embodiment of the present invention, a multipolymer may comprise about 25 wt % of hard segments, and about 75 wt % of soft segments, of which there may be about 15 wt % of oxygen-permeable materials, about 5 wt % of hydrophilic materials, and about 80 wt % of hydrophobic materials.

In a further exemplary embodiment of the present invention, a multipolymer may comprise about 30 wt % of hard segments, and about 70 wt % of soft segments, of which there may be about 20 wt % of oxygen-permeable materials, less than about 1 wt % of hydrophilic materials, and about 79 wt % of hydrophobic materials.

In a further exemplary embodiment of the present invention, a multipolymer may comprise (expressed in wt % of total multipolymer dry weight) about 25-35 wt %, such as 28-32 wt %, of hard segments, about 2540 wt %, such as 30-35 wt %, of a polycarbonate, about 15-25 wt %, such as 18-20 wt %, of polyethylene oxide, and about 15-25 wt %, such as 18-20 wt %, silicone, fluorocarbon or fluorinated polyether. In an embodiment of the present invention, polyethylene oxide may be replaced by a polycarbonate, which may be the same or a different polycarbonate from the other polycarbonate segments. Thus, in the example above, a multipolymer may comprise 40-65 wt %, such as 45-55%, of one or more polycarbonates.

Thus, in an embodiment of the present invention, a multipolymer may comprise hard segments, relatively hydrophobic soft segments, such as polycarbonate, and oxygen permeable segments, such as silicone, fluorocarbon or fluorinated polyether.

In an embodiment of the present invention, a membrane constructed from a multipolymer in accordance with an embodiment of the present invention may have a variety of thicknesses. In an embodiment, any suitable membrane thickness may be utilized. In an embodiment of the present invention, a relatively thin membrane may be utilized to control permeability characteristics, such as less than 5 microns, for example about 14 microns.

An embodiment of the present invention for use in glucose sensors in contact with blood or interstitial fluids of the human body may be characterized by the various types of suitable soft segment material types for the soft segment domains of the multipolymer. In an embodiment of the present invention, suitable oxygen-permeable soft segments may be oligomeric polysiloxane domains where the silicon-oxygen backbone may be substituted with various carbon-containing functional groups ($-O-Si(R_2)-$)$_n$ where R is an alkyl, substituted alkyl, cycloalkyl, substituted cycloalkyl, aryl, or heteroaryl group and which oligomer may be terminated with hydroxyalkyl ($-Si(CH_2)_nOH$) or (-alkylamine ($-Si(CH_2)_nNH_2$), optionally-containing ether linkages between the silicon atom and the active hydrogen groups, or terminated with other active hydrogen-containing groups or moieties bonded to silicon via a Si—C or Si—O—C bond that may be combined via linkages such as ester, ether, amide, urea, and urethane with other segments of the polymer backbone. In an embodiment of the present invention, suitable hydrophilic soft segments may be poly-(oxyalkylene) chains such as poly-(oxyethylene) ($OCH_2CH_2-$)$_n$ or poly-(oxytetramethylene) ($OCH_2CH_2CH_2CH_2-$)$_n$ or polyoxyalkylenes with >4 methylene groups per repeat unit oligomeric or polymeric materials. Block or random copolymers of polyoxyalkylenes may also provide suitable hydrophilic soft segments if they contain sufficient hydrophilic content to impart to the membrane polymer the required water absorption and/or glucose permeability. For example, a polyethyleneoxide-polypropylene oxide copolymer may be used in place of a polyethyleneoxide homopolymer. Telechelic polyvinylpyrrolidone with terminal active hydrogen groups may also provide suitable hydrophilic soft segments. In an embodiment of the present invention, suitable biostable, relatively hydrophobic soft segments may be polycarbonate chains where difunctional carbonate esters link difunctional alcohols such as ethylene, propylene, butylenes, hexamethylene and higher glycols ($-O(CH_2)_n-O(CO)-$)$_m$.

In an embodiment of the present invention, a fluorine-containing soft segment such as a perfluorinated or partially fluorinated hydrocarbon or polyether, or polyalkylsiloxane may be used. In an embodiment of the present invention, the multipolymer's end groups may comprise perfluorinated or partially fluorinated hydrocarbons, polyethers, or polyalkylsiloxanes. Fluorine-containing polymers are known to be permeable to oxygen, and thus, in an embodiment of the present invention, a fluorine-containing polymer may used in the oxygen permeable soft segments.

In an embodiment of the present invention, a membrane may utilize one or more fluorinated soft segments as the oxygen-permeable soft segment. Because polydimethylsiloxane, fluorinated soft segments (perfluorinated hydrocarbons or partially or perfluorinated polyethers or silicones, for example) are so hydrophobic, in an embodiment of the present invention, hydrophilic end groups may be chosen from telechelic or semi-telechelic polyethyleneoxide, polyvinylalcohol or polyvinylpyrrolidone. In an embodiment of the present invention, the use of hydrophilic surface modifying end groups may help reduce fibrous tissue encapsulation around the sensor that may negatively affect the detection of glucose.

In an embodiment of the present invention, a multipolymer may comprise surface modifying end groups. In an embodiment of the present invention, such surface modifying end groups may comprise less than about 10 wt % of the multipolymer.

The specific properties of the polymers and of the membranes or fibers prepared from them may vary according to the specific nature and proportions of the various domains of the block copolymer. For instance, in an embodiment of the present invention, if enhanced oxygen permeability is desired for a given use, the proportion of oxygen permeable polysiloxane soft segment content may be increased. In an embodiment of the present invention, if increased biostability is desired, the proportion of biostable hydrophobic soft segment material may be increased in the multipolymer.

Embodiments of the present invention may possess properties of enhanced biostability relative to previously disclosed polymer compositions in applications where strength/durability, selective permeability of aqueous solutes and oxygen, and/or suitability for long-term exposure to biological fluids in living organisms may be desired.

In an embodiment of the present invention, a multipolymer or a membrane or fiber prepared therefrom may be formed with a low water pickup. For example, in an embodiment of the present invention, a low water pickup may be provided by reducing or limiting the relative amount of hydrophilic soft segments in the multipolymer. For example, in an embodiment of the present invention, a multipolymer may provide a water pickup of less than about 25 wt % of dry weight of the multipolymer membrane, for example less than about 10 wt %, for example less than about 5 wt %, such as less than about 2 wt %.

Figure 2:
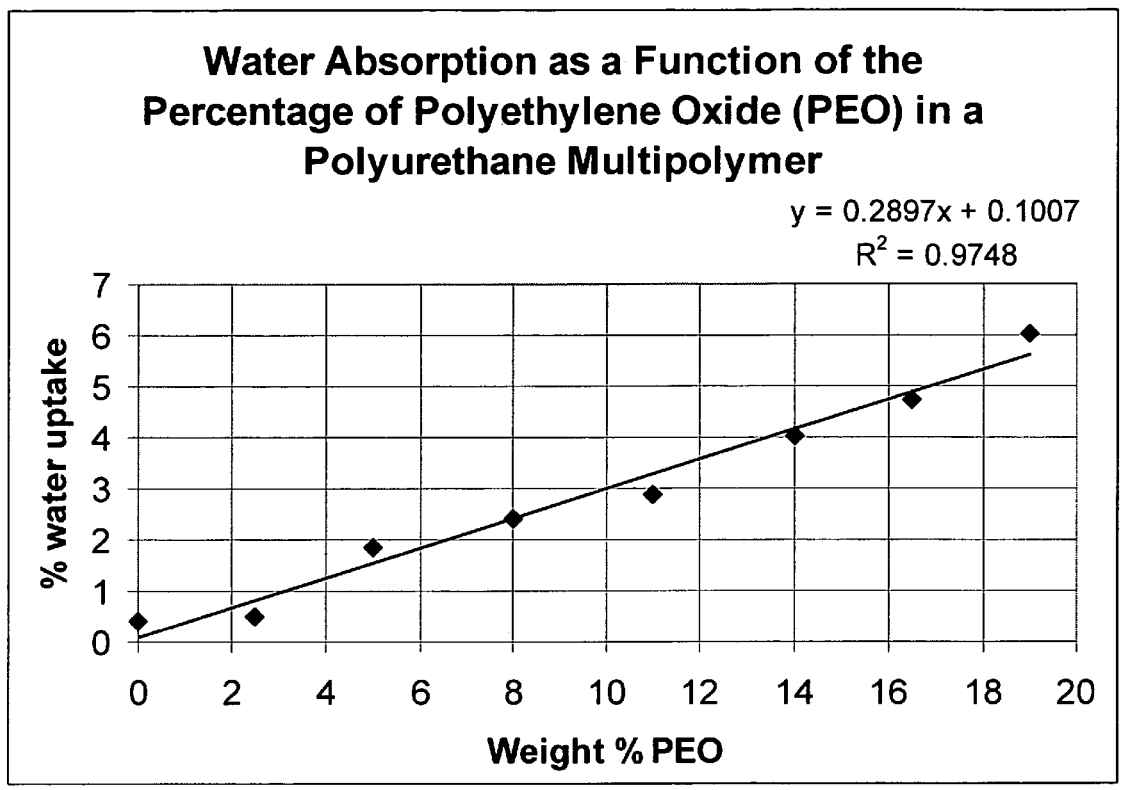
FIG. 2 shows a data set illustrating the percentage of water uptake by polyurethane membranes made with varying percentages of polyethylene oxide in accordance with an embodiment of the present invention.

FIG. 2 provides mean data demonstrating that membranes according to certain embodiments of the present invention take up very little water. The experimental procedure was performed as follows: membrane materials were made from a polyurethane multipolymer into which various fractions of polyethylene oxide (PEO) were incorporated. These membranes were approximately one mil (25 microns) in thickness. Multiple membranes made from each fraction of PEO content were used in this study. Membranes were fully dried then weighed. The membranes were then immersed in purified water for 18-24 hours. After water absorption, membranes were removed from water, and reweighed, being careful to remove all droplets of water on the surface of the membrane. Percent water uptake is defined as $[(Ww-Wd)/Wd] \times 100$. Ww refers to the weight of the membrane plus the absorbed water and Wd refers to the dry weight, that is the weight of the membrane without the absorbed water. The data in FIG. 2 (which depict the average of multiple membranes for each fraction of PEO) demonstrate that the water uptake for all tested percentages of PEO (even the relatively high percentage of 19%) was less than 10%.

In an embodiment of the present invention, oligomeric aliphatic polycarbonate soft segment domains may be included in a multipolymer through introduction of oligomeric polycarbonate materials into the reaction mixtures forming the multipolymer. The polycarbonate oligomers may possess terminal reactive hydroxyl groups, terminal amine groups or other active hydrogen groups which may react with the isocyanate groups of the hard segment oligomers to form urethane linkages joining the ends of the polycarbonate soft segments to the ends of the polyurethane hard segments. In an embodiment of the present invention, the proportions of polycarbonate soft segments in a multipolymer may be controlled just as for the other soft segments as described herein through control of the relative proportions of these components in the multipolymer-forming reactions.

In accordance with the teachings of embodiments of the present invention, multipolymers may be synthesized to have the desired permeability to oxygen and glucose, and to have adequate physical strength and durability and to resist biological degradation and oxidative breakdown in the human body. In an embodiment of the present invention, such multipolymers may form membranes having very low water absorption of from about 0.25%-10% of dry weight.

In an embodiment of the present invention, a multipolymer may be formed into a membrane having a dry tensile strength of from 1000 to 5000 psi.

In an embodiment of the present invention, a multipolymer may be formed into a membrane having an ultimate elongation of 100 to 1,000%.

In an embodiment of the present invention, a multipolymer may be used in connection with sensors for detecting the oxygen content of various biological fluids in the human body. In an embodiment of the present invention, an oxygen-sensing electrode may be contained partially or entirely within a coating or layer of the multipolymer, whose oxygen-permeable soft segment component proportion has been adjusted to provide for a high degree of oxygen permeability enabling accurate detection of oxygen level, whose hydrophilic soft segment component proportion has been controlled to allow for free diffusion of the aqueous solutions of body fluids containing dissolved oxygen through the multipolymer membrane, and whose biostable hydrophobic soft segment component proportion has been adjusted to provide membrane stability in the presence of the reactive materials and enzymes contained within the body fluid in which the sensor may be immersed. In an embodiment of the present invention, multipolymers providing controlled oxygen permeability may be prepared as outlined below in Example 1.

In an embodiment of the present invention, a multipolymer as discussed herein may be used in a permselective membrane in a variety of analyte sensors, such as described in WO 2004/063718 and WO 2005/074810, the entire disclosures of which are hereby incorporated by reference. For example, in an embodiment of the present invention, a permselective membrane may be utilized as a membrane to control the influx of glucose and oxygen, for example to limit the influx of glucose, in connection with a glucose sensor.

According to an embodiment of the present invention, a membrane is not polarized and thus does not regulate flow of chemicals differently in one direction than in the other direction. Thus, in an embodiment of the present invention, a permselective membrane as described herein may be used to regulate the flow of a drug to a region outside a device.

In an embodiment of the present invention, a multipolymer as discussed herein may be used in a permselective membrane in a variety of implantable drug delivery devices containing drugs, secretagogue-producing cells, or other biologically-active substances to be delivered at a controlled rate within the body. Various shaped articles such as tubes, sacs or hollow fibers may be fabricated as a drug reservoir in accordance with the teachings herein and/or by the methods described in U.S. Pat. Nos. 5,756,632; 5,589,563; and 5,428,123, the entire disclosures of which are hereby incorporated by reference, and may, in an embodiment, be charged with the substance to be delivered together with optional inert ingredients or solvents. For the purposes of embodiments of the present invention, the term "drug reservoir" should be broadly construed to encompass various shapes, including tubes, sacs, hollow fibers, etc. for holding and/or delivering a drug to a body.

In an embodiment of the present invention, the delivery rate within the body may be determined, in part, by the concentration driving force across the membrane, the composition of the membranes, i.e., the hard segment content and the concentration of the various soft segments, and by membrane thickness. The value of a membrane with selective permeability and structural strength, and integrity due to enhanced biostability of the polymers of embodiments of the present invention together with reduced fibrous capsule formation around the implant due to hydrophilic surface modifying end groups may be well appreciated by those skilled in the art of drug delivery and immuno-isolation devices such as described in U.S. Pat. Nos. 5,756,632; 5,589,563; and 5,428,123.

In an embodiment of the present invention, there is provided a drug delivery apparatus having an insertable portion that is insertable in an animal body, either partially or fully implanted. In an embodiment of the present invention, at least part of the insertable portion comprises a drug reservoir comprised of a multipolymer having at least one hard segment, about 55 to 90 wt % of soft segments, including about 5 to 25 wt %, of total soft segment weight, of an oxygen permeable soft segment, less than about 25 wt %, of total soft segment weight, of a hydrophilic soft segment, and about 50 to 90 wt %, of total soft segment weight, of a biostable, hydrophobic soft segment. Other percentages and/or other compositions of such a multipolymer may provided in accordance with the teachings of embodiments of the present invention.

EXAMPLES

Example 1

Solution-Based Synthesis

In accordance with an embodiment of the present invention, an exemplary synthetic method is presented herein below, based upon polyurethane chemistry. Those skilled in the art will readily understand, however, based upon this disclosure, how to append surface modifying end groups (SMEs) to other segmented and block copolymers, random copolymers, graft copolymers, and homopolymers. Polymers in accordance with embodiments of the present invention may be prepared as solution-based polymers (dissolved in organic solvent), as thermoplastic polymers (100% solids, no solvent), as water-borne emulsions or dispersions (polymer dispersed in a water phase), or as two-component castable polymers. Synthetic procedures, which may enable the preparation of a multitude of polymers by changing soft segments, isocyanates, chain extenders, and/or endgroups, are described below. More details relating to the synthetic methods that may be employed to make SME-containing polymers according to embodiments of this invention may be found in U.S. Pat. No. 5,589,563, the entire disclosure of which is hereby incorporated by reference.

In accordance with an embodiment of the present invention, in this Example, the soft segments of the multipolymer comprise polyhexyl ethyl carbonate diol (PHECD) having a molecular weight of 2000, polyethylene glycol (PEG) having a molecular weight of 1500, and polydimethylsiloxane diol (PDMSD) having a molecular weight of 1000, and the hard segment comprises 4,4'-diphenylmethane diisocyanate (MDI) having a molecular weight of 250.26 and ethylene diamine (ED) having a molecular weight of 60.1, and the endgroups comprise methoxy polyethylene glycol (mPEG) having a molecular weight of 2000 and mono-functional OH-terminated polydimethyl siloxane (mPDMS) having a molecular weight of 2000. A reactor is charged with 8.6 moles of PHECD, 6.9 moles of PDMSD, 0.044 moles of mPDMS and 3.8 moles of PEG. The reactants are dried under vacuum with a nitrogen purge. Then 32.7 moles of 4,4'-diphenyl-methane diisocyanate solution in dimethylacetamide is added to the reactor, and the contents of the reactor are further diluted with additional dimethylacetamide solvent. The ingredients are stirred for 3 hours at 55° C. The contents of the reactor are then diluted with more dimethylacetamide solvent, and cooled to 40° C. Polymer synthesis is completed by adding 12.5 moles of ethylene diamine in dimethylacetamide solvent and stirring at 40° C. for 30 minutes.

The resulting polymer has the following characteristics:

| Reactant | Molecular Weight | Weight-% | Moles |
|---|---|---|---|
| PHECD | 2000 | 41.8 | 8.6 |
| PEG | 1500 | 14.9 | 3.8 |
| PDMSD | 1000 | 18.8 | 6.9 |
| MDI | 250.26 | 22.3 | 32.7 |
| ED | 60.1 | 2.1 | 12.5 |
| mPDMS | 2000 | 0.24 | 0.044 |

Example 2

In accordance with an embodiment of the present invention, experiments were carried out to directly measure the degree to which varying oxygen tensions affect the glucose response of a very low water pickup multipolymer. For these experiments, the multipolymer polyurethane membrane comprises a low percentage of hydrophilic soft segment: 1.25 wt % polyethylene oxide.

Sensors were tested in concentrations of dissolved oxygen that varied widely. These experiments were carried out at a glucose concentration of 15 mM. Sensors were made using a platinum wire indicating electrode and a Ag/AgCl reference electrode. The indicating electrode was directly surrounded by a specificity membrane made up of sulfonated polyether sulfone, 10% solids in dimethylacetamide solvent, which was dip coated on to the wire electrode. After application, the solvent evaporates and the sulfone membrane adheres to the underlying electrode. This membrane is designed to exclude interfering agents, as disclosed in U.S. Pat. No. 6,613,379, the entire disclosure of which is hereby incorporated by reference.

External to the specificity membrane, there was a glucose oxidase membrane applied by dip coating the sensor in a mixture of compounds whose concentrations are given here as an exemplary weight percentage: water (89%), glucose oxidase (8.4%), albumin (1.75%), and glutaraldehyde (0.6%). As the water evaporates, the enzyme mixture adheres to the underlying layer.

In accordance with an embodiment of the present invention, the permselective multipolymer polyurethane membrane was applied over the glucose oxidase membrane. To apply the permselective membrane, sensors were dipcoated with a polyurethane multipolymer whose water pickup was 0.5-1%. This polyurethane coating material was a 13-15% solution (weight percentage) solvated in dimethylacetamide, and after coating, the solvent was allowed to evaporate.

After testing of the sensors in varying fractions of oxygen, the percent error due to a change in oxygen was calculated. The sensitivity to glucose at a very high oxygen tension of 150 Torr was compared to the sensitivity to glucose at a very low oxygen tension, 30 Torr. The percent loss of sensitivity was used as the metric of signal loss due to oxygen decline. In other words, a marked loss of sensitivity would signify that the sensor would not be able to function independently of changes in oxygen tension.

Figure 3:
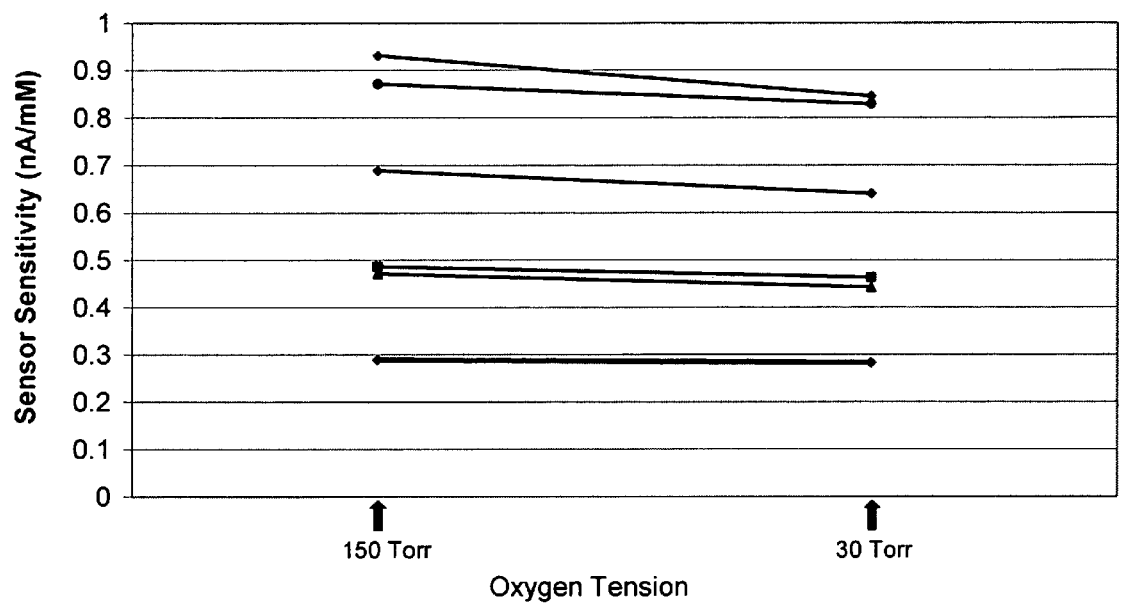
FIG. 3 shows data from a glucose sensor measuring glucose at a glucose concentration of 15 mM at two ambient oxygen tensions (150 Torr and 30 Torr) in accordance with an embodiment of the present invention.

Using this membrane, there was very little error (6%) in the response to glucose attributable to changes in oxygen tension (see FIG. 3), thus demonstrating that this multipolymer membrane is suitable for use in persons with widely varying oxygen tensions.

Example 3

In an exemplary embodiment of the present invention, total soft segments comprise about 62-70 wt %, total hard segments comprise about 24-31 wt %, and total surface modifying end groups total about 5-9 wt %. In an embodiment of the present invention, the soft segments may further comprise about 5-19 wt % polyethylene oxide, about 15-20 wt % silicone, and about 65-75 wt % polycarbonate. In an embodiment of the present invention, a membrane may provide water uptake of about 1-8% of total dry polymer weight for a membrane about 14 microns thick.

In an embodiment of the present invention, various solvents may be used, such as dimethylacetamide (DMAC), with a percent solids in dip solution of about 10-13%, and a percent solvent of about 87-90%.

Although certain embodiments have been illustrated and described herein for purposes of description of the preferred embodiment, it will be appreciated by those of ordinary skill in the art that a wide variety of alternate and/or equivalent embodiments or implementations calculated to achieve the same purposes may be substituted for the embodiments shown and described without departing from the scope of the present invention. Those with skill in the art will readily appreciate that embodiments in accordance with the present invention may be implemented in a very wide variety of ways. This application is intended to cover any adaptations or variations of the embodiments discussed herein. Therefore, it is manifestly intended that embodiments in accordance with the present invention be limited only by the claims and the equivalents thereof.

What is claimed is:

1. A biocompatible multipolymer capable of forming a glucose-limiting permselective membrane, said multipolymer having
   a hydrophilic soft segment, wherein less than about 5% of total soft segment weight is made up of the hydrophilic soft segment; and
   an oxygen-permeable soft segment, wherein said oxygen-permeable soft segment comprises at least one of a perfluorinated or partially fluorinated hydrocarbon and a perfluorinated or partially fluorinated polyalkylsiloxane.

2. A biocompatible multipolymer capable of forming a glucose-limiting permselective membrane, said multipolymer having
   a hydrophilic soft segment, wherein less than about 5% of total soft segment weight is made up of the hydrophilic soft segment; and
   surface modifying end groups, wherein said surface modifying end groups comprise at least one of perfluorinated or partially fluorinated hydrocarbons, perfluorinated or partially fluorinated polyethers, and perfluorinated or partially fluorinated polyalkylsiloxanes.

3. A glucose-limiting permselective membrane, comprising:

a multipolymer having at least one soft segment, wherein less than about 5% of total soft segment weight is made up of a hydrophilic soft segment and wherein said membrane has an average loss of sensitivity to analyte permeation of less than 10% over an oxygen tension range between 30 Torr and 150 Torr.

4. A glucose-limiting permselective membrane, comprising:

a multipolymer having at least one soft segment, wherein less than about 5% of total soft segment weight is made up of a hydrophilic soft segment and wherein said membrane has an average loss of sensitivity to analyte permeation of less than 5% over an oxygen tension range between 30 Torr and 150 Torr.

* * * * *